United States Patent [19]
Whited

[11] Patent Number: 6,064,726
[45] Date of Patent: May 16, 2000

[54] FULLY FLEXIBLE ROUTING SYSTEM

[75] Inventor: John L. Whited, Richardson, Tex.

[73] Assignee: Alcatel USA Sourcing, L.P., Plano, Tex.

[21] Appl. No.: 09/002,195

[22] Filed: Dec. 31, 1997

[51] Int. Cl.$^7$ .................................................. H04M 3/42
[52] U.S. Cl. .......................................... 379/201; 379/207
[58] Field of Search ..................................... 379/201, 207, 379/219, 242, 243, 220, 211, 112, 114

[56] References Cited

U.S. PATENT DOCUMENTS

| | | | |
|---|---|---|---|
| 5,506,897 | 4/1996 | Moore et al. | 379/220 |
| 5,592,541 | 1/1997 | Fleischer, III et al. | 379/220 X |
| 5,771,279 | 6/1998 | Cheston, III et al. | 379/201 X |
| 5,937,412 | 8/1999 | Kohli et al. | 379/112 X |
| 5,940,487 | 8/1999 | Bunch et al. | 379/201 |

FOREIGN PATENT DOCUMENTS

| | | | |
|---|---|---|---|
| 0649265 | 4/1995 | European Pat. Off. | H04Q 3/00 |
| 0763954 | 3/1997 | European Pat. Off. | H04Q 3/545 |
| 2308040 | 6/1997 | United Kingdom | H04Q 3/545 |
| 9523483 | 8/1995 | WIPO | H04Q 3/00 |

OTHER PUBLICATIONS

R. Slabon, et al., "Development and Introduction of Services in the Intelligent Network of the Deutsche Bundespost", Innovations in Switching Technology, Stockholm, May 28–Jun. 1, 1990, pp. 59–62.

P. Zolzettich, et al., "Customized Service Creation: A New Order for Telecommunication Services", One World Through Communications, Florence, IEEE InfoCom, May 4–8, 1992, pp. 1014–1019.

M. Fujioka, et al., "Universal Service Creation and Provision Environment for Intelligent Network", IEEE Communications Magazine, Vol. 29, No. 1, Jan. 1991, pp. 44–51.

J. Urata, et al., "A Development Method for Customized Services with Hierarchical Structured SLPs", IEEE International Conference on Communications, Dallas, Jun. 23–27, 1996, pp. 42–46.

PCT Search Report, dated Apr. 6, 1999.

Primary Examiner—Creighton Smith
Attorney, Agent, or Firm—Baker & Botts, L.L.P.

[57] ABSTRACT

A telecommunications network with fully flexibly routing is disclosed. The telecommunications network (100) includes switching systems (112, 114) and a service control system (104) that controls at least one of the switching systems. The service control system (104) includes a routing database (150), a plurality of service logic programs and a routing engine (140). The routing engine (140) receives current feature identifying information and invokes at least one of the service logic programs corresponding to the current feature identifying information. The routing engine (140) accesses the routing database (150) to determine next feature identifying information and invokes at least one of the service logic programs corresponding to the next feature identifying information. The telecommunications network may implement a customized routing scheme without the need to design and deploy customized service logic programs.

20 Claims, 3 Drawing Sheets

FIG. 4 150

TABLE 1 (DAY OF WEEK)

| SRI | FEATURE INDEX | START DAY | END DAY | NEXT FEATURE TYPE | NEXT FEATURE INDEX |
|---|---|---|---|---|---|
| 100 | 1 | MONDAY | FRIDAY | 2 | 1 |
| 100 | 1 | SATURDAY | SATURDAY | 2 | 2 |
| 100 | 1 | SUNDAY | SUNDAY | 3 | 1 |

TABLE 2 (TIME OF DAY)

| SRI | FEATURE INDEX | START TIME | END TIME | NEXT FEATURE TYPE | NEXT FEATURE INDEX |
|---|---|---|---|---|---|
| 100 | 1 | 09:00 | 17:00 | 0 | 1 |
| 100 | 1 | 17:01 | 08:59 | 3 | 1 |
| 100 | 2 | 12:00 | 17:00 | 0 | 1 |
| 100 | 2 | 17:01 | 11:59 | 3 | 1 |

TABLE 3 (LONG DISTANCE)

| SRI | FEATURE INDEX | REGION | NEXT FEATURE TYPE | NEXT FEATURE INDEX |
|---|---|---|---|---|
| 100 | 1 | LOCAL | 0 | 1 |
| 100 | 1 | NON-LOCAL | 0 | 2 | ical field of the invention

FULLY FLEXIBLE ROUTING SYSTEM

TECHNICAL FIELD OF THE INVENTION

This invention relates generally to the field of telecommunications networks and more particularly to a fully flexible routing system.

BACKGROUND OF THE INVENTION

In advanced intelligent network (AIN) telecommunications systems, service control points utilize service logic programs to control the routing of a call. Generally, for non-standard customer routing requirements, specialized service logic programs must be custom-designed and implemented for each customer. If the customer wishes to modify its routing requirements, the service logic programs for that customer must be taken off-line, edited and redeployed. The custom design and editing of service logic programs are costly and inefficient processes.

SUMMARY OF THE INVENTION

Therefore, a need has arisen for a telecommunications network that addresses the disadvantages and deficiencies of the prior art.

A telecommunications network with fully flexibly routing is disclosed. In one embodiment, the telecommunications network includes switching systems and a service control system that controls at least one of the switching systems. The service control system includes a routing database, a plurality of service logic programs and a routing engine. The routing engine receives current feature identifying information and invokes at least one of the service logic programs corresponding to the current feature identifying information. The routing engine accesses the routing database to determine next feature identifying information and invokes at least one of the service logic programs corresponding to the next feature identifying information.

A technical advantage of the present invention is that the telecommunications network may implement a customized routing scheme without the need to design and deploy customized service logic programs. Another technical advantage is that the routing scheme can be readily modified without the editing and redeployment of service logic programs. Yet another technical advantage is that the service logic programs used to implement the customized routing scheme may be generic and reusable in nature. Still another technical advantage is that the service logic programs and the routing engine used to implement the customized routing scheme may be service independent building-blocks (SIBs) or may be assembled using SIBs.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which:

FIG. 4 is an illustration of an exemplary routing database in the telecommunications network.

DETAILED DESCRIPTION OF THE INVENTION

Figure 1:
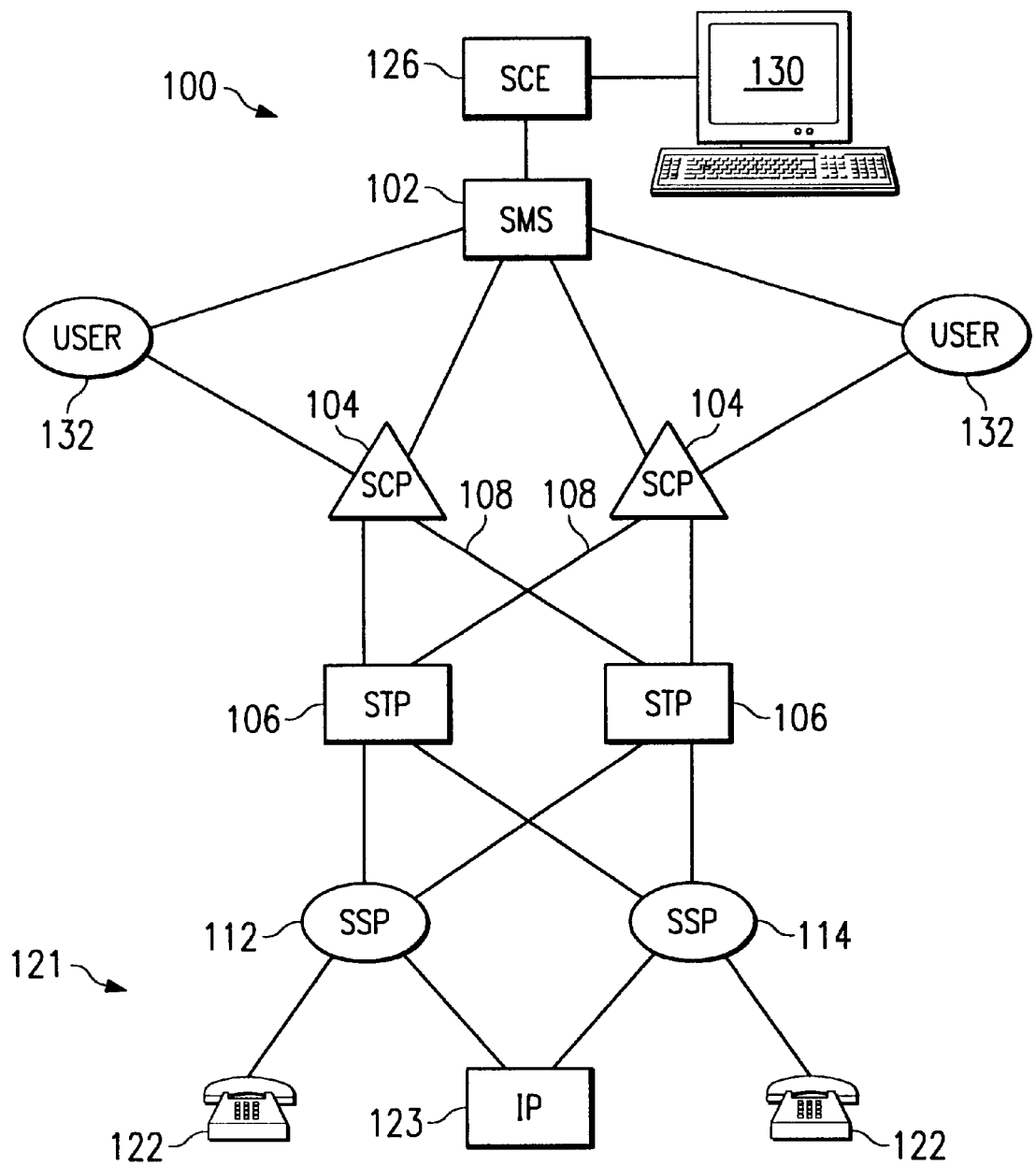
FIG. 1 is a block diagram of a telecommunications network constructed in accordance with one embodiment of the present invention.

FIG. 1 is a block diagram of a telecommunications network 100, such as an advanced intelligent network (AIN). Telecommunications network 100 includes a service management system 102 that interfaces with a plurality of service control point systems or service control points (SCP) 104 and a plurality of signal transfer point systems or signal transfer points (STP) 106 via an industry standard protocol, such as X.25. Service management system 102 provides network information, database management, and administrative support for telecommunications network 100. Service management system 102 generally interfaces with service control points 104 for provisioning, database management, service control point application program management, and collecting traffic metering measurement data. Service control points 104 may also be directly linked to signal transfer points 106 via a signaling system number 7 (SS7) link set 108. Signal transfer points 106 are further coupled through signaling system number 7 link set 108 to one or more service switching points 112 and 114, which perform switching and call handling functions in the network. Service control points 104 are transaction based processing systems whose primary responsibility is to respond to queries from service switching points 112 and 114 for data needed to complete routing of a call. Service switching points 112 and 114 are part of a public switched telephone network (PSTN) and are coupled to the telephone service subscribers or customers 121, which include wire-based telephones and wireless telephones 122, and intelligent peripherals 123. It will be understood that service control points 104, signal transfer points 106 and service switching points 112 may be functions combined and implemented on one or more platforms rather than discrete points in telecommunications network 100.

A service creation environment 126 allows the creation of service logic programs that may be downloaded to service control points 104 and signal transfer points 106 through service management system 102 for execution. Programmers of service creation environment may interface with service creation environment 126 through a computer terminal coupled to service creation environment 126.

Service independent building blocks (SIBs) are building blocks sometimes used to construct service logic programs to implement network services. These service independent building blocks, as defined in the International Telecommunication Union ITU-T Q.1213, are primarily used in a service creation environment (SCE) 126 through a user interface 130 to produce the service logic programs that are then downloaded to network elements such as service management system 102, service control point 104, and/or signal transfer point 106, where they are executed.

Figure 2:
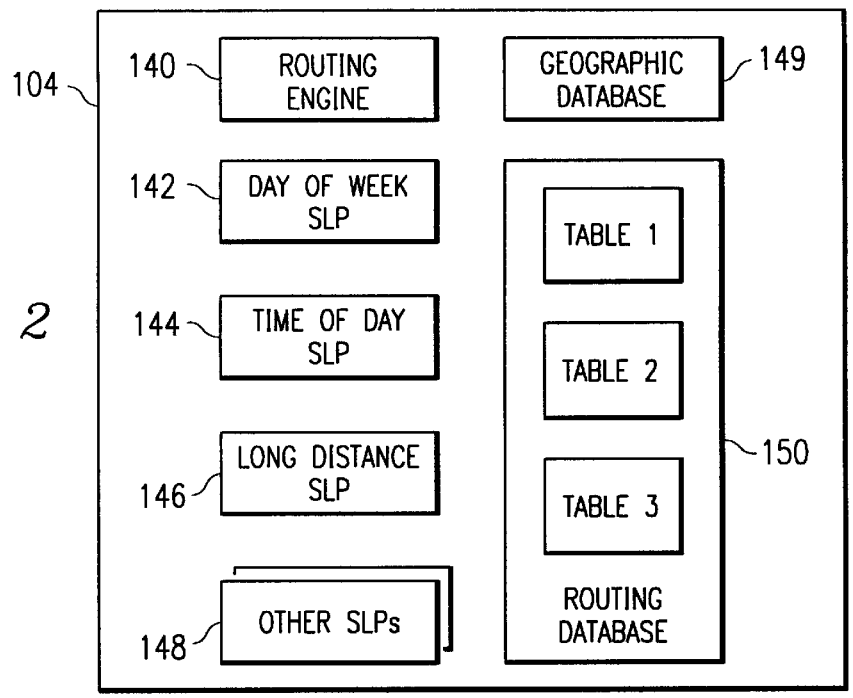
FIG. 2 is a block diagram of an exemplary service control point in the telecommunications network.

Referring to FIG. 2, an exemplary service control point 104 is shown. Service control point 104 performs customized service routing for subscribers of telecommunications network 100. To perform this function, service control point 104 utilizes a routing engine, service logic programs 142 through 148 and a routing database 150. The operation and interaction of these various components will be described more fully below.

When a call is to be processed by service control point 104, any number of service logic programs 148 may be used to provide service to the caller. For example, a service logic program that interacts with the caller may be implemented to receive caller input. Other service logic programs 148 of a type well known to those skilled in the art may also be implemented. These service logic programs 148 may be generic in nature or may be custom-designed for a particular customer.

At any point in the processing of the call, a service logic program 148 may invoke routing engine 140. When this occurs, a fully flexible routing tree controlled by routing engine 140 is implemented. This fully flexible routing tree is implemented using generic, reusable service logic programs and a fully provisionable database, as will be explained more fully below.

For purposes of illustration, it will be assumed in the following description that the number being called is owned by a call center. In this example, the call center is fully staffed from 9:00 am to 5:00 pm Monday through Friday, and from 12:00 pm to 5:00 pm on Saturday. During those times, the call center is to receive calls through its main telephone number for distribution by an automatic call distributor (ACD) to its agents. At all other times, the call center has less than full staffing, so the incoming calls to the main number may face significant queue waiting times before being answered by an agent. Thus, at these times, the customer wishes to have incoming long distance telephone calls diverted to its voice mail facility so that the calls may be returned when an agent becomes available. However, local calls are still to be directed to the call center's main telephone number.

To accomplish this routing in the customary manner, a specialized service logic program would have to be custom-designed and implemented for the customer. If the customer wished to modify its routing requirements, for example to send all (local and non-local) calls to voice mail during off-hours, the service logic program would have to be taken off-line, edited and redeployed. However, service control point 104 uses fully flexible routing to accomplish this call routing using generic, reusable service logic programs and an easily modifiable database.

Figure 3:
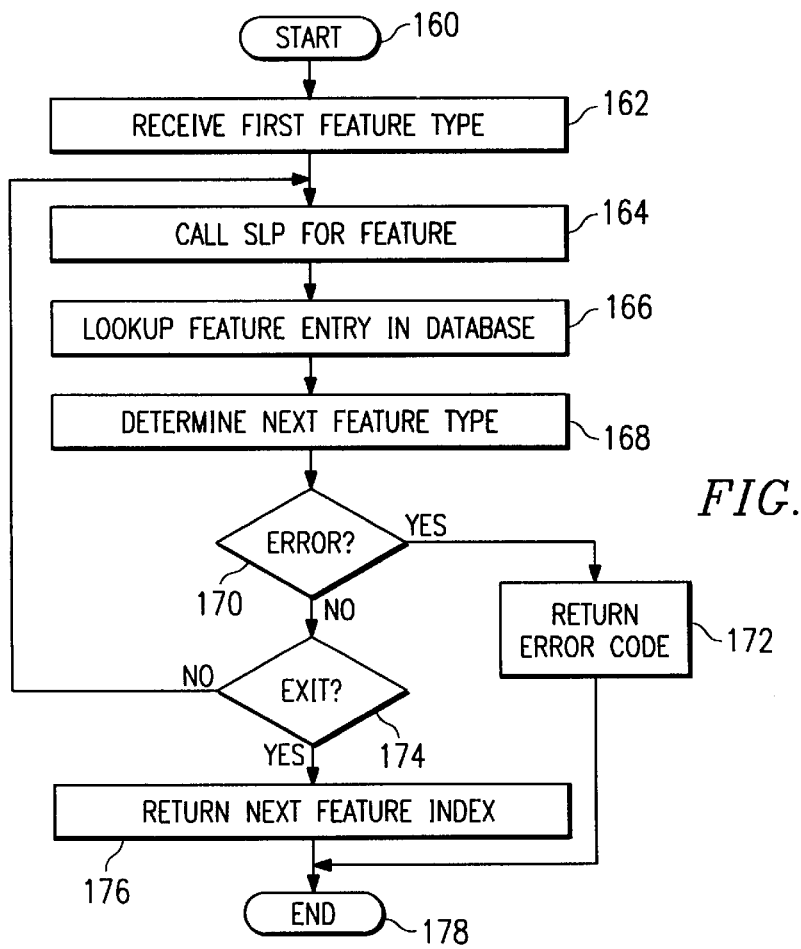
FIG. 3 is a flowchart illustrating the operation of a routing engine in the telecommunications network.

Referring to FIG. 3, a flowchart illustrating the operation of routing engine 140 is shown. As previously described, routing engine 140 may be invoked by a service logic program at service control point 104 or when service control point 104 first receives the call. When routing engine 140 is invoked, an initial feature type is identified in the invocation command. This initial feature type is received by routing engine 140 at step 162. At step 164, routing engine 140 calls the service logic program corresponding to the initial feature type.

In this example, the initial feature type specified when routing engine 140 is invoked is Feature Type 1. This feature type is a day-of-week determination corresponding to SLP 142 and Table 1 of routing database 150. By reference to an internal or external index, routing engine 140 determines that Feature Type 1 corresponds to SLP 142. Routing engine 140 therefore invokes SLP 142, which checks a system clock to determine what day of the week it is. In this example, SLP 142 determines that it is Saturday. This information is returned to routing engine 140. At step 166, routing engine 140 refers to routing database 150 for routing information.

Referring to FIG. 4, an exemplary routing database 150 containing the customer-specific routing information outlined above is shown. Specifically, each table corresponds to a particular feature type. Each table includes a super-routing index (SRI) column that identifies the telephone number being called or some other customer identifying information. In this example, the telephone number has been determined to belong to "customer 100," which is the call center in question. Each table also includes a feature index column, which will be explained more fully below. Each table also includes one or more columns corresponding to the specific variable according to which the feature is supposed to provide routing, referred to hereinafter as a "decision variable." In this example, Table 1 is used for day-of-week routing, and therefore has two columns specifying a start day and an end day for each pertinent day-of-week range. Each table further includes a "Next Feature Type" column and a "Next Feature Index" column specifying, respectively, the feature type and feature index that routing engine 140 is to invoke next.

In this example, routing engine 140 refers to Table 1 at step 166 to determine the next feature type and feature index to invoke based upon the current day of the week. Using an SRI of 100 and a feature index of "1" (assumed for the initial feature invoked by routing engine 140), routing engine 140 looks for the day-of-week range that includes Saturday. Thus, to avoid errors, the day-of-week ranges should be specified without any overlap between the ranges.

At step 168, routing engine 140, having established that the current day of the week is Saturday, determines from Table 1 that the next feature type is "2" and the next feature index is "2." At step 170, routing engine 140 determines whether the feature type and feature index received from routing database 150 are valid. If not, then an error is returned at step 172 and execution of routing engine 140 ends at step 178.

If the feature type and feature index received from routing database 150 are valid, then routing engine 140 determines whether the feature type received from routing database 150 is in fact an exit code. A specific feature type, such as zero, may be specified in advance as an exit code to end execution of routing engine 140. If this code is received as the next feature type, then at step 176 routing engine 140 returns the value received as the next feature index and stops execution at step 178. This aspect of the present invention will be described more fully below.

If the feature type and feature index received from routing database 150 are valid and the feature type is not an exit code, then routing engine 140 returns to step 164, where the SLP corresponding to the next feature type is invoked. This recursive process continues until the exit code is received as the next feature type.

In this example, the next feature type is "2" and the next feature index is "2." Routing engine 140 therefore invokes SLP 144, the service logic program corresponding to feature type "2." This SLP checks a system clock to determine the current time of day, in this example 1:00 pm. Routing engine 140 then refers to routing database 150 to determine the next feature type and the next feature index. Because the current feature type is "2," routing engine 140 refers to Table 2. With a feature index of "2" and a current time of 11:00 am, routing engine 140 determines that the next feature type is "3" and the next feature index is "1."

Note that, in Table 2, a (current) feature index of "2" corresponds to Saturday. Thus, the two time ranges specified for routing are 12:00 pm to 5:00 pm and all other times. For a feature index of "1," corresponding to Monday through Friday, different time ranges are specified, reflecting the different staffing hours on weekdays.

Returning to the present example, with a next feature type of "3" and a next feature index of "1," routing engine invokes SLP 146 corresponding to feature type "3." This SLP determines whether the incoming call is a long distance call. To make this determination, SLP 146 must receive the area code of the caller. This information is normally available to service control point 104, and may be passed to routing engine 140 at invocation. With this information, SLP 146 may refer to a geographic database 149 to determine whether the area code of the caller indicates that the incoming call is long distance or not. The result is returned to routing engine 140, which then refers to Table 3 of routing database 150 to determine the next feature type and next feature index. In this example, the call is local, and therefore the next feature type is "0" and the next feature index is "1."

When routing engine 140 receives a next feature type of "0," it determines at step 174 that an exit code has been received. Routing engine 140 therefore returns the value of the next feature index, in this case "1." This value may be used by other SLPs 148 to accomplish further routing of the call. In this example, the value "1" causes the call to be connected to call center's main number, whereas a value "2," corresponding to an after-hours long-distance call, would cause the call to be routed to a voice mail facility.

It will be appreciated that the above-described routing scheme can be readily modified by editing routing database 150. There is no need to redeploy customized SLPs after a change in routing database 150. Moreover, service logic programs 142 through 146 are generic in nature and may be used by a variety of customers, even though the precise routing requirements of each customer may vary. The variation in routing requirements is contained entirely within routing database 150. Service logic programs 142 through 146 may be service independent building-blocks (SIBs), or may be assembled using SIBs. Likewise, routing engine 140 is not customer-specific in nature and may be a SIB or assemblage of SIBs.

An example of another SLP that may be implemented in this routing system is a day-of-year SLP to determine whether the current day is a special day of the year, such as Christmas, which may require special routing instructions. Yet another example is a percentage allocation SLP, used to distribute calls along different routes on a percentage allocation basis, to achieve a statistically desirable distribution of calls. Other examples will be readily apparent to those skilled in the art.

While the invention has been particularly shown and described by the foregoing detailed description, it will be understood by those skilled in the art that various other changes in form and detail may be made without departing from the spirit and scope of the invention.

What is claimed is:

1. A service control system comprising:
   a routing database;
   a plurality of service logic programs; and
   a routing engine operable to receive current feature identifying information, and operable to invoke at least one of the service logic programs corresponding to the current feature identifying information, and operable to access the routing database to determine next feature identifying information, and operable to invoke at least one of the service logic programs corresponding to the next feature identifying information.

2. The service control system of claim 1, wherein the routing database comprises a plurality of tables, each table corresponding to a feature.

3. The service control system of claim 2, wherein at least one of the tables comprises:
   a customer identifying field;
   a decision variable field; and
   the next feature identifying information.

4. The service control system of claim 3, wherein the decision variable field comprises a day-of-week field.

5. The service control system of claim 3, wherein the decision variable field comprises a time-of-day field.

6. The service control system of claim 3, wherein the decision variable field comprises a geographic field.

7. The service control system of claim 1, wherein each service logic program comprises at least one service independent building block.

8. The service control system of claim 1, wherein the routing engine comprises at least one service independent building block.

9. A telecommunications network comprising:
   a plurality of switching systems;
   a service control system operable to control at least one of the switching systems, the service control system having a routing database, a plurality of service logic programs and a routing engine, the routing engine being operable to receive current feature identifying information, the routing engine being operable to invoke at least one of the service logic programs corresponding to the current feature identifying information, the routing engine being operable to access the routing database to determine next feature identifying information, the routing engine being operable to invoke at least one of the service logic programs corresponding to the next feature identifying information.

10. The telecommunications network of claim 9, wherein the routing database comprises a plurality of tables, each table corresponding to a feature.

11. The telecommunications network of claim 10, wherein at least one of the tables comprises:
   a customer identifying field;
   a decision variable field; and
   the next feature identifying information.

12. The telecommunications network of claim 11, wherein the decision variable field comprises a day-of-week field.

13. The telecommunications network of claim 11, wherein the decision variable field comprises a time-of-day field.

14. The telecommunications network of claim 11, wherein the decision variable field comprises a geographic field.

15. The telecommunications network of claim 9, wherein each service logic program comprises at least one service independent building block.

16. The telecommunications network of claim 9, wherein the routing engine comprises at least one service independent building block.

17. A method for routing a call, comprising the steps of:
   (a) receiving at a routing engine current feature identifying information;
   (b) invoking a service logic program corresponding to the current feature identifying information; and
   (c) accessing the routing database to determine next feature identifying information.

18. The method of claim 17, further comprising the step of:
   (d) iteratively repeating steps (b) and (c) to accomplish routing of the call.

19. The method of claim 17, further comprising the step of receiving at the routing engine customer identifying information.

20. The method of claim 17, further comprising the step of receiving decision variable information from the service logic program, wherein the step of accessing the routing database to determine the next feature identifying information comprises the step of locating an entry in the routing database corresponding to the decision variable information.

* * * * *